United States Patent [19]

Dunk et al.

[11] Patent Number: 4,581,402

[45] Date of Patent: Apr. 8, 1986

[54] NOVEL STABLE WATER IN OIL DISPERSIONS OF HYDROSOLUBLE CATIONIC POLYMERS BASED ON SALIFIED OR QUATERNIZED DIMETHYLAMINOETHYL ACRYLATE, PROCESS OF PREPARATION THEREOF AND APPLICATION THEREOF AS FLOCCULENTS

[75] Inventors: William Dunk, Gonesse; Jean Cabestany, Stains; Claude Trouvé, Yerres, all of France

[73] Assignee: Societe Francaise Hoechst, Puteaux, France

[21] Appl. No.: 465,869

[22] PCT Filed: Jun. 10, 1982

[86] PCT No.: PCT/FR82/00096

§ 371 Date: Feb. 3, 1983

§ 102(e) Date: Feb. 3, 1983

[30] Foreign Application Priority Data

Jun. 12, 1981 [FR] France ................................. 81 11617

[51] Int. Cl.$^4$ ................................................. C08K 5/10
[52] U.S. Cl. ..................................... 524/317; 524/555; 524/755; 524/814; 524/815; 526/287; 526/292.2; 526/307.3; 526/312
[58] Field of Search ............... 524/317, 555, 815, 755, 524/814; 526/312, 292.2, 307.3, 287

[56] References Cited

U.S. PATENT DOCUMENTS

| | | | |
|---|---|---|---|
| 3,997,492 | 12/1976 | Kane et al. | 524/812 |
| 4,029,622 | 6/1977 | Keller et al. | 524/369 |
| 4,078,133 | 3/1978 | Ozima | 526/87 |
| 4,299,755 | 11/1981 | Keggenhoff et al. | 524/55 |
| 4,319,013 | 3/1982 | Cabestany et al. | 524/555 |
| 4,396,752 | 8/1983 | Cabestany et al. | 524/555 |

FOREIGN PATENT DOCUMENTS 1478987 6/1977 United Kingdom.
1562417 3/1980 United Kingdom.

Primary Examiner—Joseph L. Schofer
Assistant Examiner—J. M. Reddick
Attorney, Agent, or Firm—Sheridan Neimark; Karl W. Flocks

[57] ABSTRACT

The invention relates to stable water in oil dispersions, of hydrosoluble cationic polymers based on salified or quaternized dimethylaminoethyl acrylate copolymerized or not with acrylamide, and containing more than 5%(in moles) of cationic units uniformly and not statistically distributed along the chains, presenting a composition by weight of from 20 to 55% of polymers, from 20 to 45% of oil, from 1 to 5% of at least two emulsifying agents, and the balance to 100% being water, the oil phase being a mixture of normal $C_{10}$–$C_{13}$ alkanes, one of the emulsifying agents having an HLB of 3 to 5, and good solubility in the oil phase, and a lipophilous group of a carbonated ramified chain of at least 16C and the other having an average HLB of 12 to 16, the percentages by weight of both agents being from 0.5 to 3% relative to the weight of the dispersion.

12 Claims, No Drawings

NOVEL STABLE WATER IN OIL DISPERSIONS OF HYDROSOLUBLE CATIONIC POLYMERS BASED ON SALIFIED OR QUATERNIZED DIMETHYLAMINOETHYL ACRYLATE, PROCESS OF PREPARATION THEREOF AND APPLICATION THEREOF AS FLOCCULENTS

This invention relates to novel stable water-in-oil dispersions of hydrosoluble cationic polymers based on salified or quaternized dimethylaminoethyl acrylate, their process of preparation and their application.

Preparation of water in oil dispersions of acrylamide polymers is described, among others, in U.S. Pat. Nos. 3,284,393 and 3,826,771 and in British Pat. No. 1,562,417.

Such water in oil dispersions are generally obtained by polymerizing a water in oil emulsion of an aqueous solution of acrylamide or an aqueous solution of acrylamide and a co-monomer in the presence of an emulsifying agent. Various emulsifying agents have been proposed (see French Pat. No. 2 333 815).

Moreover, according to French Pat. No. 2 390 983 and the French patent application No. 79-30711 filed by the Applicants, it is known to obtain through polymerization in water in oil emulsion, cationic powder polymers soluble in water, based on acrylamide and salified or quaternized dimethylaminoethyl acrylate, having uniform distribution of the cationic units along the copolymer chains.

However, Applicants have now discovered novel stable, water in oil dispersions of hydrosoluble cationic polymers based on salified or quaternized dimethylaminoethyl acrylate containing in molar ratios, more than 5% of cationic units uniformly distributed along the copolymer chains.

According to the invention, it is meant by salified or quaternized dimethylaminoethyl acrylate either a strong mineral acid salt of dimethylaminoethyl acrylate such as dimethylaminoethyl acrylate hydrochloride, or a quaternary ammonium obtained through quaternization of dimethylaminoethyl acrylate by a $C_1$-$C_4$ dialkyl sulfate or a $C_1$-$C_4$ alkyl chloride or bromide.

According to the invention, these water in oil stable dispersions are characterized by the following points taken in combination:

(1°) They possess a composition by weight of from 20 to 55% of polymers, from 20 to 45% of oil, from 1 to 5% of emulsifying agents, and the balance to 100% of water;

(2°) the polymers are based on salified or quaternized dimethylaminoethyl acrylate, pure or in admixture with acrylamide, the latter being then in molar proportions lower than or equal to 95%;

(3°) the oil phase is constituted by one or more normal $C_{10}$-$C_{13}$ alkanes having a boiling point of between 180° and 275° C.;

(4°) the emulsifying agents consist of at least two emulsifying agents, one of which has a HLB of between 3 and 5, and a good solubility in the oil phase at the room temperature, and a lipophilous group consisting of a ramified carbonated chain having at least 16 carbon atoms, and the other has an average HLB of between 12 and 16.

Advantageously, the first emulsifying agent is selected among the esters of isostearic acid and sorbitane; there will be mentioned in particular sorbitane isostearate and sorbitane sesquiisostearate.

As to the second emulsifying agent, it is advantageously selected among the ethoxylated alkyl phenols, the fatty acids esters of polyethoxylated sorbitane such as for example ethoxylated nonylphenols with an ethoxylation rate of 8 to 20, ethoxylated octylphenols with an ethoxylation rate of 9 to 11, ethoxylated sorbitane mono-oleate with 20 moles of ethylene oxide.

According to another characteristic, the respective percentages by weight of both emulsifying agents are of between 0.5 and 3% relative to the total weight of the dispersion.

As a matter of interest, HLB designates the hydrophilous lipophilous balance of an emulsifying agent, i.e. the equilibrium between the size and the force of the hydrophilous groups, on the one hand, and on the other hand, the lipophilous groups of the emulsifying agent. A definition of HLB is given by W. C. GRIFFIN in "Classification of Surface active agents by HLB"—J.Soc.-Cosmetic Chemists, 1950, page 311.

There is commonly designated by "isostearic acid" a mixture in variable proportions of heptadecanoic acids substituted by a methyl group on one of carbon atoms numbered from 2 to 16.

The dispersions according to the invention are moreover characterized by:

A stability higher than three months at the temperature of 20°–25° C.;

An instantaneous solubility in water;

An intrinsic viscosity of the included polymers, determined at 25° C. in a molar solution of sodium chloride higher than 9 dl/g;

A viscosity at 20° C. determined by a Brookfield viscosimeter, model RVT, at the speed of 50 rotations per min., higher than 3 poises;

A viscosity at 1% in aqueous solution determined at 20° C. by a Brookfield viscosimeter, model RVT, at the speed of 20 rotations per minute, on the included polymers, higher than 35 poises;

A total absence of coagulum.

One object of the invention is also the process of preparation of such dispersions through polymerization of the monomer(s) in an inverted water in oil emulsion at a pH of between 3 and 6, in the presence of an initiating agent.

Initiation of the polymerization reaction is effected with radicalar initiators which can give birth to free radicals through thermal decomposition or coupled decomposition. Such radicalar initiators are known and they belong, for example, to the families of mineral or organic peroxides, aliphatic azocompounds, redox systems. Those radicalar initiators can be either hydrosoluble or lipo-soluble or finally, partly soluble in water.

Advantageously, according to the process of the invention, the selected radicalar initiator generates lipo-soluble free radicals in the continuous phase such as the cumene hydroperoxide and sodium metabisulfite, tertiobutyl hydroperoxide and dimethyltetradeca-amine couples, and the like.

Initiation of the polymerization reaction is achieved at a temperature of between +5° and +55° C. When the initiation reaction is effected with a redox system, providing free radicals in the continuous phase, it is advantageously achieved at a temperature lower than, or equal to, +10° C. However, when there is used an aliphatic azocompound such as 2,2-azo-bis(2-amidinopropane)-dihydrochloride, azobisisobutyronitrile, the initiation reaction is effected at a temperature lower than or equal to 55° C.

The polymerization reaction does not directly provide water in oil dispersions having a composition by weight higher than 40% of polymers. In order to be able to prepare dispersions according to the invention, containing up to 55% by weight of polymers, at the end of the polymerization reaction, these dispersions are concentrated through distillation up to the desired concentrations. This distillation operation becomes possible due to the excellent stability of the dispersions according to the invention.

According to the process of the invention, the polymerization reaction is achieved by starting from a water in oil emulsion containing by weight from 20 to 40% of monomer(s), from 20 to 45% of oil, from 0.5 to 3% of an emulsifying agent, of a HLB of between 3 and 5, such as previously defined, then after initiation of the polymerization according to the above-mentioned means, the polymerization reaction is carried out adiabatically. It is known that polymerization of acrylates and acrylamide is exothermal. Therefore, it is necessary to provide a water in oil emulsion stable at such a thermal shock. This stability of the emulsion independent of the temperature and designated sometimes by "entropic stability" results from the use of a very specific previously defined emulsifying agent.

Such excellent thermal stability of the dispersions according to the invention permits thereafter, if necessary, concentrations thereof through distillation up to a composition by weight lower than or equal to 55% of polymers.

The combination of the various factors of the process according to the invention i.e. selection of the monomer(s), of the continuous phase, of the emulsifying agents, and the initiating agent, of the initiation of the polymerization at a temperature lower than or equal to 10° C. when a redox couple is used, and of a polymerization reaction carried out adiabatically results into rapid polymerization kinetics characterized by the following kinetic parameters, where $\theta$ represents the temperature and t the time:

$\theta$Maximum $-\theta$initial: lower than or equal to 90° C.;
$(d\theta/dt)_{maximum}$: lower than or equal to 30° C./min.
$\Delta\theta/\Delta t$: between 1° and 10° C./min., on the one hand, and on the other hand, provides a water in oil dispersion of polymers based on salified or quaternized dimethylaminoethyl acrylate having an intrinsic viscosity, as determined at 25° C. in molar solution of sodium chloride, always higher than 9 dl/g.

More specifically, when the polymerization is initiated through a redox system, the process according to the invention is carried out by starting from a water in oil emulsion of the monomer(s) obtained, through addition by stirring at 20±2° C., of the aqueous solution of the monomer(s), and possibly of the water soluble constituent of the selected redox couple, in the oil phase containing the low HLB emulsifying agent. The emulsion so prepared can be advantageously homogenized for several seconds through a colloid mill, then it is carefully deoxygenized by a pure nitrogen bubbling, and finally, it is cooled to a temperature lower than, or equal to, 10° C. At this temperature, under stirring, and in an inert atmosphere, the polymerization reaction is initiated through addition of either the second constituent of the redox couple, or of the redox couple, when both constituents thereof are soluble in the continuous phase.

The polymerization reaction is carried out adiabatically and when the temperature of the reactional medium begins its decrease it is maintained by slightly heating it externally for 0.1 to 4 hours, then the reactional medium is cooled to 40±5° C., a temperature at which the second emulsifying agent of a HLB of between 12 and 16 is introduced therein. At this point, the dispersion may either be used as such or concentrated through distillation up to a concentration by weight of 55% in polymers.

When the polymerization reaction is initiated by an aliphatic azocompound, the process according to the invention is carried out as mentioned previously, up to the deoxygenization phase of the water in oil emulsion containing the monomer(s), the emulsifying agent of a low HLB and the aliphatic azocompound. Then, the emulsion is heated under stirring, and in an inert atmosphere, at the speed of 1±0.5° C., per minute, up to a temperature lower than or equal to 55° C. The polymerization initiation thus being effected, the exothermal reaction is permitted to develop adiabatically, then, when the temperature of the reactional medium begins to decrease, the process is continued as previously by slight heating and adding the second emulsifying agent thereto. There is thus obtained a dispersion according to the invention which may be either used as such or concentrated through distillation up to a concentration by weight of 55% in polymers.

Another object of the invention is the application of the dispersions according to the invention as flocculating agents, for example, for clarification of raw waters and residual waters, to the treatment of urban waters or in the paper industry. In such applications, very diluted solutions are used so that the dispersions according to the invention must be diluted in water, which can readily be made.

It is known that the flocculent properties of a hydrosoluble cationic polymer are the better the higher the average molecular weight of such polymer on the one hand, and on the other hand, are in dependence of the maximum displaying of the polymer chains. The polymers of the dispersions according to the invention having always an intrinsic viscosity higher than 9 dl/g are constituted, according to Mark-Houwink's law, of polymers having a high average molecular weight. The maximum displaying of the chains of a cationic polymer in diluted aqueous solution is ensured by the alternate and not statistic distribution of the cationic sites along the polymer chains.

According to French patent application No. 79-30711, it is known that the reactivity ratios of the acrylamide-salified or quaternized dimethylaminoethyl acrylate couple are particularly favourable to regular distribution of the cationic units along the polymer chains whatever be the transformation rate and/or the initial monomer composition. In the dispersions according to the invention, both of such factors, i.e. high average molecular weight and maximum displaying of the chains in diluted aqueous solution being united, they have a good efficiency for treatment of waters. Moreover, the range of their cationicity being very wide, they are suited both for waters little loaded as well as highly loaded with suspension materials and they are also suited to the coalescence of the emulsions and/or the flocculation of the very colloidal hydrophilous suspensions having a high concentration of volatile materials. These unexpected qualities of the dispersions according to the invention are brought to light by means of a flocculation test. It consists of flocculating a mud in a given time period with the dispersions according to the invention. During the practical realization of the test, there is determined the required quantity expressed in kg of dry polymers per ton of dry mud, of dispersions according to the invention in order to obtain in a given time period a half sedimentation, i.e. a height of decanted mud equal to half the initial height of treated mud. By comparing through this test different dispersions according to the invention on muds coming either from Achères Purification Station in the urban area of Paris, brought to 8.5 g/l, or muds from the Purification Station of the city of Creil brought to 7.5 g/l, and determining a half sedimentation time of 45 to 75 seconds, the following results, given in Tables 1 and 2, are obtained:

TABLE 1

Test of Achères muds at 8.5 g/l
Half sedimentation time: 50 seconds
100% CHA as in Example 1: 3.33 kg/t

TABLE 2

Tests of Creil muds at 7.5 g/l
Half sedimentation time: 70 seconds
70/30 AAM/CHA as in Example 2: 1.82 kg/t
70/30 AAM/CHA as in Example 4: 1.67 kg/t.

The following Examples are given by way of explanation of the invention and not limitatively. In such Examples, acrylamide is designated as AAM, dimethylaminoethyl acrylate hydrochloride as CHA, dimethylaminoethyl acrylate quaternized by methyl chloride as CMA, dimethylaminoethyl acrylate quaternized by dimethylsulfate as MSA; intrinsic viscosities are determined at 25° C. in molar solution of sodium chloride.

EXAMPLE 1

Into a solution of 21 g of sorbitane sesquiisostearate in 300 g of normal $C_{10}$–$C_{13}$ alkanes having a boiling point of between 195° and 230° C., there is introduced under stirring a solution of 400 g of CHA, and 0.2625 g of 2,2-azo(2-amidino-propane)-dihydrochloride in 300 g of water. The formed emulsion is then submitted for several seconds to vigorous stirring through a colloid mill. Thus, there is obtained a water in oil dispersion of the monomer having a viscosity of 5 poises, as determined at 20° C. with a Brookfield viscosimeter, model RVT, rotating at 50 rotations per min. After careful deoxygenization through nitrogen bubbling, the emulsion is heated to 40° C. at a speed of 1° C. per min. At this temperature, the polymerization reaction starts and the temperature of the reactional medium reaches 60±2° C. in 8 min. The reactional medium is maintained for 3 hours at this temperature, then it is heated for 30 mn. at 75° C. At this point, a test sample reveals a residual monomer concentration lower than, or equal to 0.1%. Thereafter, there is introduced in 15 mm, into the emulsion cooled to 40° C., 20 g of nonylphenol ethoxylated with 10 moles of ethylene oxide, then, the dispersion is brought to the room temperature. Thus, there is obtained a water in oil dispersion of CHA homopolymer containing by weight 38.5% of polymer, 28.5% of oil, 3.9% of emulsifying agents and 28.8% of water, and having an intrinsic viscosity of 10.1 dl/g, a viscosity at 1% in water as determined at 20° C. by a Brookfield viscosimeter, model RVT, at the speed of 20 rotations per mn., of 2,375 centipoises, and a viscosity on product such as determined at 20° C. by a Brookfield viscosimeter at the speed of 50 rotations per mn., of 480 centipoises.

Such dispersion is stable at least for 4 months at the room temperature.

EXAMPLE 2

Into a solution of 22 g of sorbitane isostearate in 260 g of normal $C_{10}$–$C_{13}$ alkanes having a boiling point of between 195° and 230° C., there is introduced under stirring a solution having a pH of 5.2, of 189 g of CHA, of 161 g of AAM, of 0.0525 g of ammonium peroxodisulfate in 390 g of water. The formed emulsion is then submitted for several seconds to the effect of a colloid mill, then it is carefully deoxygenized by a nitrogen bubbling and finally, it is cooled to 5° C. At this temperature, there is introduced under stirring and in an inert atmosphere a solution of 0.03 g of sodium sulfite in 2 g of water.

After several minutes, the temperature of the reactional medium increases quickly to 62° C. at the maximum rate of 22° C. per mn. When the temperature of the reactional medium decreases to 60° C., it is heated to 75° C. for 30 mn, then it is cooled down to 40° C. At this temperature, there is introduced 20 g of nonylphenol ethoxylated with 10 moles of ethylene oxide and then, the reactional medium is cooled to the room temperature. Thus, a dispersion according to the invention is obtained, containing by weight 33.5% of 70/30 AAM/CHA polymers in molar proportions, 24.9% of oil, 4.2% of emulsifying agents and 37.4% of water, having a viscosity of 350 cPs, as determined at 20° C. by a Brookfield viscosimeter rotating at 50 rotations per minute. The dispersed polymer has a viscosity at 1% in water as determined at 20° C. by a Brookfield viscosimeter rotating at a speed of 20 rotations per mn, of 36 poises, and an intrinsic viscosity of 10.2 dl/g. Such dispersion is stable at least for 4 months at the room temperature.

EXAMPLE 3

Into a solution of 22.2 g of sorbitane sesquiisostearate in 260 g of normal $C_{10}$–$C_{13}$ alkanes having a boiling point of between 195° and 230° C., there is introduced under stirring a solution having a pH of 3.5, of 168 g (2.37 moles) of acrylamide, of 181.9 g (1.015 moles) of CHA in 390 g of water. The formed emulsion is thereafter submitted for several seconds to the effect of a colloid mill, then it is carefully deoxygenized through a pure nitrogen bubbling, and then cooled to 1° C. At this temperature, there is introduced under stirring and in an inert atmosphere a solution of 0.0525 g of cumene hydroperoxide in 10 cm³ of normal $C_{10}$–$C_{13}$ alkanes, then in 20 nm a solution of 0.222 g of sodium metabisulfite in 30 g of water. The temperature of the reactional medium quickly increases to 48° C. in 12 mn as soon as sodium metabisulfite has been added thereto. When the introduction has been completed, the reactional medium is maintained for 1 hour at 70° C., then it is cooled to 40° C. At this temperature there is introduced 20 g of nonylphenol ethoxylated with 10 moles of ethylene oxide, then the dispersion obtained is cooled to the room temperature. There is thus produced a water in oil dispersion containing by weight 32.4% of 70/30 AAM/CHA polymers in molar ratios, 24.8% of oil, 3.9% of emulsifying agents and 38.9% of water. Such dispersion has a viscosity of 788 cPs as determined at 20° C. by a Brookfield viscosimeter, model RVT, rotating at a speed of 50 rotations per minute. The dispersed polymer has a viscosity at 1% in water of 5,400 cPs as determined at 20° C. by a Brookfield viscosimeter, model RVT, and an intrinsic viscosity of 17.5 dl/g.

Such dispersion is stable at least for 4 months at the room temperature.

EXAMPLE 4

There is prepared according to Example 3 a water in oil dispersion at 33.6% by weight of 70/30 AAM/CHA copolymer in molar ratios having at 20° C. according to a Brookfield viscosimeter, model RVT, a viscosity of 350 cPs. 250 g of such dispersion is heated under stirring at 70° C. for 75 mn in an open beaker. After cooling to the room temperature, no formation of gel is observed either on the beaker walls or the stirrer and a water in oil dispersion of a 70/30 AAM/CHA copolymer is molar ratios is obtained, containing by weight 50.4% of copolymer as determined by precipitation in acetone, stable for a storage time of 4 months at the room temperature.

EXAMPLE 5, COMPARATIVE

Example 4 is reproduced starting from a water in oil dispersion at 33.6% by weight of a 70/30 AAM/CHA copolymer in molar ratios prepared as in Example 3, but using instead of sorbitane sesquiisostearate, sorbitane mono-oleate, also having an HLB of 3 to 5; in the course of the heating a significant coagulation of the dispersion is obtained. After cooling to the room temperature, and filtering out the gel formed, there is obtained a polymerized dispersion in oil unstable during storage.

EXAMPLE 6

There is prepared according to a procedure similar to that described in Example 3, a water in oil dispersion having a Brookfield viscosity of 300 cPs (speed: 50 rotations per mn) and containing by weight 28.7% of 92-8 AAM/CHA copolymers in molar ratios, having an intrinsic viscosity of 15 dl/g.

The preceding water in oil dispersion containing by weight 28.7% of 92-8 AAM/CHA copolymers in molar ratios is introduced as an aqueous solution at a concentration of 20 g/l into an industrial paper machine provided with the so called retention flocculating agent feed system and working with a paper pulp of a concentration of 8 g/l of dry materials consisting of 55% of fibers, of 31% of scraps (recovered papers), of 14% of calcium carbonate as well as traces of various adjuvents such as cationic starch, glue.

Thereafter, the pass retention is determined, as a function of the introduced quantity of dispersions according to the invention.

The pass retention is given by the following relation:

$$RP = (CCT - CEB \cdot 100)/CCT$$

where
RP: pass retention,
CCT: concentration of pulp in the head box,
CEB: concentration of pulp in white waters.

The following results are obtained in terms of kg of dispersion per ton of manufactured paper:

Neutral glueing, pH of the pulp: 7.5

| Dosage in kg/ton of manufactured paper | Pass retention |
|---|---|
| 1.5 | 72.5% |
| 1.6 | 73.45% |
| 1.8 | 75.45% |

Acid glueing, pH of the pulp: 5.5

| Dosage in kg/ton of manufactured paper | Pass retention |
|---|---|
| 0.4 | 55.1% |
| 0.5 | 64.3% |

It will be understood that this invention was only described in a purely explanatory manner and not at all limitatively and that any useful modification using equivalent means can be applied thereto without departing from its scope.

We claim:

1. A water in oil dispersion stable at the room temperature for more than 3 months, comprising at least one hydrosoluble cationic polymer selected from the group consisting of salified or quaternized dimethylaminoethyl acrylate homopolymers and copolymers with acrylamide and containing in molar ratios more than 5% of cationic units uniformly and not statistically distributed along the polymer chains; said dispersion having a composition by weight of 20 to 55% of said at least one polymer, 20 to 45% of oil, 1 to 5% of at least 2 emulsifying agents, and the balance to 100% being water, the oil phase of such dispersion being a mixture of normal $C_{10}$-$C_{13}$ alkanes, at least one of such emulsifying agents being sorbitane isostearate or sorbitane sesquiisostearate, and the other emulsifying agent having an average HLB of between 12 and 16 and being selected from the group consisting of ethoxylated alkyl phenols and fatty acid esters of ethoxylated sorbitane, the respective percentage by weight of both emulsifying agents being of between 0.5 and 3% relative to the total weight of the dispersion.

2. Stable water in oil dispersion according to claim 1, wherein the dispersed polymer has an intrinsic viscosity higher than or equal to 9 dl/g as determined at 25° C. in molar solution of sodium chloride.

3. Stable water in oil dispersion according to claim 1, having the following physical characteristics: instantaneous water solubility; a viscosity at 20° C. as determined by a Brookfield viscosimeter, model RVT, at the speed of 50 rotations per mn, higher than 3 poises; a viscosity at 1% in aqueous solution as determined at 20° C. by a Brookfield viscosimeter, model RVT, at the speed of 20 rotations per mn, on the included polymers, higher than 35 poises; a total absence of coagulum.

4. Stable water in oil dispersion according to claim 1, wherein dimethylaminoethyl acrylate is salified by hydrochloric acid.

5. Stable water in oil dispersion according to claim 1, wherein dimethylaminoethyl acrylate is quaternized by methyl chloride.

6. Stable water in oil dispersion according to claim 1, wherein dimethylaminoethyl acrylate is quaternized by dimethyl sulfate.

7. A process of preparing a dispersion comprising selecting a desired concentration of at least one polymer in said dispersion ranging from 20–55% by weight, adiabatically and exothermally polymerizing, under stirring and in an inert atmosphere, a deoxygenized water-in-oil emulsion containing in percentages by weight relative to the final weight of the dispersion, from 20 to 40% of salified or quaternized dimethylaminoethyl acrylate and acrylamide in respective molar ratios of 100% to 5% and of 0% to 95%, from 20 to 45% of normal $C_{10}$–$C_{13}$ alkanes, from 0.5 to 3% of sorbitane isostearate or sorbitane sesquiisostearate, from 10 to 59% of water, with initiation of the polymerization by a free radical generator system, maintaining, at the end of the exothermal reaction, the reactional medium at a temperature of between 60° and 80° C. by external heating, for 0.1 to 4 hours to form said at least one polymer; then, adding into the cooled dispersion, at 40±5° C., from 0.5 to 3% of an emulsifying agent having an HLB of between 12 and 16 and selected from the group consisting of ethoxylated alkyl phenols and fatty acid esters of ethoxylated sorbitane; and removing by distillation, any water present in the obtained dispersion above an amount of water necessary for said dispersion to have said desired concentration of said at least one polymer.

8. A process according to claim 7, wherein the free radical generator system used produces free radicals soluble in the oil phase.

9. A process according to claim 7 further comprising concentrating the resultant dispersion by distillation up to a concentration by weight of 55% of polymers.

10. The dispersion of claim 1, wherein said dispersion contains 20–40% by weight of said at least one polymer.

11. The process of claim 7 wherein said obtained dispersion is distilled to produce a final dispersion containing more than 40% and up to 55% by weight of said at least one polymer.

12. The dispersion prepared by the process of claim 11.

* * * * *